Patented Sept. 2, 1924.

1,507,550

UNITED STATES PATENT OFFICE.

CHARLES K. EVANS, OF ALBERT LEA, MINNESOTA.

CAR-TOP DRESSING AND METHOD OF PREPARING THE SAME.

No Drawing.   Application filed July 24, 1923.   Serial No. 653,565.

*To all whom it may concern:*

Be it known that I, CHARLES K. EVANS, a citizen of the United States, residing at Albert Lea, in the county of Freeborn and State of Minnesota, have invented a new and useful Car-Top Dressing and Method of Preparing the Same, of which the following is a specification.

This invention relates to a dressing for fabric car tops or other similar fabric.

The object of the invention is the production of a dressing or coating for the purpose stated, which will be most durable, and which will render the fabric waterproof, at the same time imparting to it the desired color which will not rub off or fade.

The preferred ingredients of the dressing, and the proportions in which they are combined are substantially as follows:

1 pint linseed oil, preferably boiled,
½ pint ocher, or other mineral pigment,
1 tablespoonful diamond dye, or other suitable dye,
2 tablespoonfuls cold water to dissolve the dye,
1 tablespoonful common salt,
2 tablespoonfuls boiling water to dissolve the salt,
2 tablespoonfuls turpentine.

In preparing the dressing, I prefer to mix the mineral pigment with the oil and to cook it for about five minutes, during which it is constantly stirred. The soluble dye is mixed with the cold water and allowed to stand until dissolved, after which it is cooked for about five minutes and constantly stirred. These two mixtures are then poured together, and the salt added which has previously been dissolved in the hot water. The mixture is then allowed to cook, and the turpentine is then added and thoroughly mixed. The dressing thus prepared may be applied to the fabric with an ordinary paint brush.

The linseed oil in the compound protects the fabric from dampness and decay, and renders it water proof. The ocher gives body to the dressing and imparts the desired color, while the dye permeates the fabric, and gives the color a bright and attractive appearance. The salt helps to set the dye, and to prevent the dressing from rubbing off. The turpentine acts as a drier, and also increases the penetration of the color into the fabric.

The proportions of the ingredients, and the manner of mixing the same may, of course, be varied to a certain extent without materially affecting the result.

What is claimed is:

1. A coating composition, consisting of a mixture of linseed oil, mineral pigment, soluble dye, common salt, turpentine, and water.

2. A coating composition, consisting of a mixture of boiled linseed oil, ocher, dye dissolved in water, common salt dissolved in water, and turpentine.

3. A coating composition consisting of the following ingredients mixed in the following proportions: one pint boiled linseed oil, one-half pint mineral pigment, one tablespoonful diamond dye dissolved in water, two tablespoonfuls common salt dissolved in water, and two tablespoonfuls of turpentine.

4. The process of making a liquid coating composition, which consists in mixing and cooking two parts boiled linseed oil with one part ocher, dissolving a relatively small amount of soluble dye in cold water and then cooking the same, then uniting the two mixtures, and adding a small amount of common salt dissolved in water substantially equal to the amount of dye, then allowing the mixture to cool, and afterward adding a small amount of turpentine.

In testimony that I claim the foregoing as my own, I have hereto affixed my signature.

CHARLES K. EVANS.